(12) United States Patent
Wang et al.

(10) Patent No.: US 12,150,002 B2
(45) Date of Patent: Nov. 19, 2024

(54) INFORMATION REPORTING METHOD AND DEVICE, AND TERMINAL

(71) Applicant: GUANGDONG OPPO MOBILE TELECOMMUNICATIONS CORP., LTD., Guangdong (CN)

(72) Inventors: Shukun Wang, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 629 days.

(21) Appl. No.: 17/377,683

(22) Filed: Jul. 16, 2021

(65) Prior Publication Data

US 2022/0007257 A1 Jan. 6, 2022

Related U.S. Application Data

(63) Continuation of application No. PCT/CN2019/072047, filed on Jan. 16, 2019.

(51) Int. Cl.
*H04W 36/30* (2009.01)
*H04W 24/10* (2009.01)
*H04W 28/086* (2023.01)
*H04W 36/10* (2009.01)
*H04W 36/00* (2009.01)

(52) U.S. Cl.
CPC ......... *H04W 36/305* (2018.08); *H04W 24/10* (2013.01); *H04W 28/0862* (2023.05); *H04W 36/10* (2013.01); *H04W 36/0069* (2018.08)

(58) Field of Classification Search
CPC .............. H04W 36/305; H04W 24/10; H04W 28/0862; H04W 36/10
See application file for complete search history.

(56) References Cited

U.S. PATENT DOCUMENTS

2016/0212753 A1* 7/2016 Wu ..................... H04W 72/542
2019/0182689 A1 6/2019 Martin et al.
(Continued)

FOREIGN PATENT DOCUMENTS

CN 105684491 A 6/2016
CN 106332114 A * 1/2017 ............ H04W 24/02
(Continued)

OTHER PUBLICATIONS

Ericsson R2-1700918: 3GPP TSG-Ran Wg2 #97. "RLM and RLF in case of LTE-NR tight internetworking, Feb. 13-17, 2017", (Year: 2017).*
(Continued)

*Primary Examiner* — Huy D Vu
*Assistant Examiner* — Robert Ma
(74) *Attorney, Agent, or Firm* — Perkins Coie LLP

(57) ABSTRACT

An information reporting method and device, and a terminal are provided. The method comprises: after detecting that a failure event occurs in a master cell group (MCG) or a failure event occurs in a secondary cell group (SCG), a terminal reports MCG failure information or SCG failure information to a network side, the MCG failure information or SCG failure information being used for network optimization by the network side, wherein the MCG is a cell group of master nodes, and the SCG is a cell group of secondary nodes.

22 Claims, 4 Drawing Sheets

(56) References Cited

U.S. PATENT DOCUMENTS

2021/0076235 A1 3/2021 Martin et al.
2021/0153281 A1* 5/2021 Deogun ................ H04W 76/16

FOREIGN PATENT DOCUMENTS

| CN | 108496385 A | 9/2018 |
| CN | 108924866 A | 11/2018 |
| WO | 2018028969 A1 | 2/2018 |
| WO | 2018203710 A1 | 11/2018 |

OTHER PUBLICATIONS

Ericsson: "RRC signaling transport for LTE-NR interworking not involving coordination" R2-1700917; 3GPP TSG-RAN WG2 #97; Athens, Greece; Feb. 12, 2017 (Feb. 12, 2017), XP051211693. 6 pages.
Supplementary European Search Report in the European application No. 19909948.2, mailed on Jan. 19, 2022. 12 pages.
Written Opinion of the International Search Authority in the international application No. PCT/CN2019/072047, mailed on Sep. 26, 2019. 9 pages with English translation.
Ericsson. "RLM and RLF in case of LTE-NR Tight Interworking", 3GPP TSG-RAN WG2 #97 Tdoc R2-1700918, Feb. 4, 2017 (Feb. 4, 2017), sections 1-3.
International Search Report in the international application No. PCT/CN2019/072047, mailed on Sep. 26, 2019.

* cited by examiner

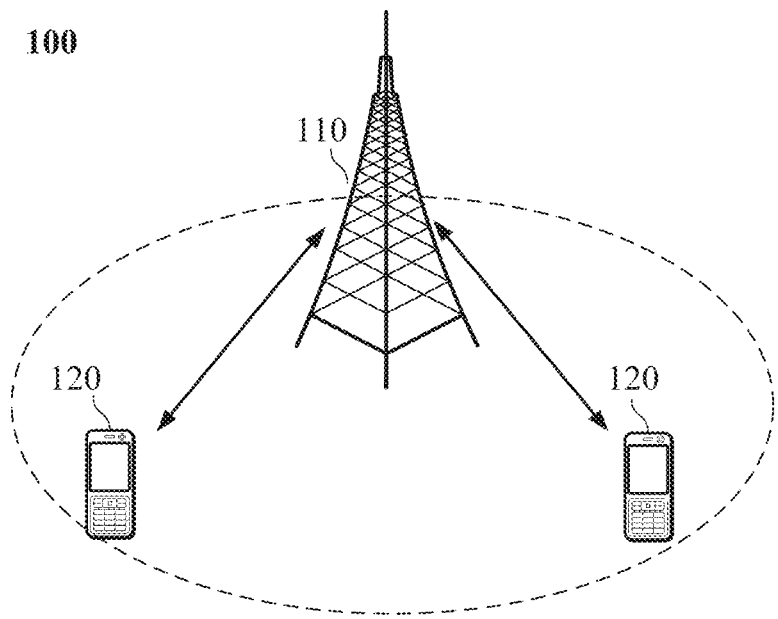

FIG. 1

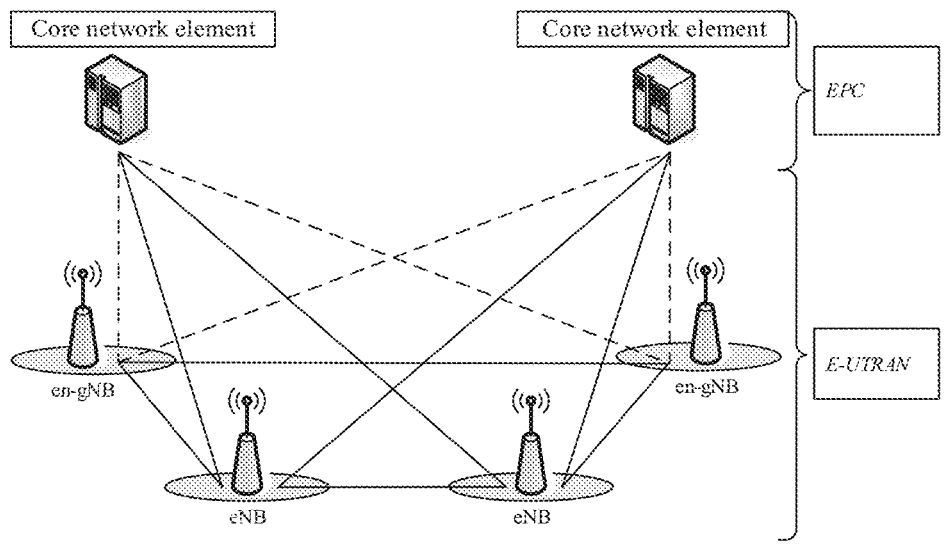

FIG. 2

After detecting that a failure event occurs on an MCG side or a failure event occurs on an SCG side, a terminal reports MCG failure information or SCG failure information to a network side, the MCG failure information or the SCG failure information being used by the network side for performing network optimization, where the MCG is a cell group of a master node and the SCG is a cell group of a secondary node. ——301

FIG. 3

| (Information existing bitmap) | | (Failure type) | Oct8 |
|---|---|---|---|
| (Target node) | (Request indication) | (timestamp) | Oct7 |
| | | | Oct6 |
| (Location type) | (Location information) | | Oct5 |
| (Location information) | | | Oct4 |
| (Location information) | | | Oct3 |
| (Measurement results) | | | Oct2 |
| (Measurement results) | | | Oct1 |

FIG. 4

| (Location type) =4 | (beam id) |
|---|---|
| (beam id) | (beam id) |
| (beam id) | R |

FIG. 5

601 — After detecting that a failure event occurs on MCG side and a failure event occurs on SCG side, a terminal triggers an RRC connection re-establishment procedure; during the RRC connection re-establishment procedure, the terminal indicates a network side that the terminal records reportable MCG failure information and SCG failure information 602 — After receiving a reporting request message from the network side, the terminal reports the MCG failure information and the SCG failure information to the network side

FIG. 6

INFORMATION REPORTING METHOD AND DEVICE, AND TERMINAL

CROSS-REFERENCE

This is a continuation application of International Patent Application No. PCT/CN2019/072047, filed on Jan. 16, 2019, the entire contents of which are incorporated herein by reference in its entirety.

TECHNICAL FIELD

Embodiments of the disclosure relate to the field of mobile communications, and more particularly to, an information reporting method and device, and a terminal.

BACKGROUND

In a dual connectivity architecture, a cell group on a Master Node (MN) side is referred to as a Master Cell Group (MCG), and a cell group on a Secondary Node (SN) side is referred to as a Secondary Cell Group (SCG). If a network side is in a dual connectivity scenario, when a failure event, such as a radio link failure, occurs on the MCG side, a Radio Resource Control (RRC) connection re-establishment is directly triggered, and the MCG failure information is not reported. If the network side is in another dual connectivity scenario, when a failure event occurs on the MCG side, the MCG failure information also cannot be reported in a case where the SCG side is not configured with a Signalling Radio Bearer (SRB). For a node having a Self-Organizing Network (SON) function, various information reported by a terminal needs to be acquired to optimize the network. However, if the terminal fails to report failure information, the efficiency of network optimization may be reduced.

SUMMARY

The embodiments of the disclosure provide an information reporting method and device, and a terminal.

The information reporting method provided in the embodiments of the present disclosure includes:

after detecting that a failure event occurs on an MCG side or a failure event occurs on an SCG side, a terminal reports a MCG failure information or SCG failure information to a network side, the MCG failure information or the SCG failure information being used by the network side for performing network optimization, where the MCG is a cell group of a master node and the SCG is a cell group of a secondary node.

The information reporting method provided in the embodiments of the present disclosure includes:

after detecting that a failure event occurs on an MCG side and a failure event occurs on an SCG side, a terminal triggers a Radio Resource Control (RRC) connection re-establishment procedure;

during the RRC connection re-establishment procedure, the terminal indicates to a network side that the terminal records reportable MCG failure information and SCG failure information;

after receiving a reporting request message from the network side, the terminal reports the MCG failure information and the SCG failure information to the network side.

The information reporting device provided in the embodiments of the present disclosure includes:

a detecting unit, configured to detect that a failure event occurs on the MCG side or a failure event occurs on the SCG side; and a reporting unit, configured to report MCG failure information or SCG failure information to a network side, the MCG failure information or the SCG failure information being used by the network side for performing network optimization, where the MCG is a cell group of a master node and the SCG is a cell group of a secondary node.

The information reporting device provided in the embodiments of the present disclosure includes:

a detecting unit, configured to detect that a failure event occurs on the MCG side and a failure event occurs on the SCG side;

a triggering unit, configured to trigger an RRC connection re-establishment procedure;

an indicating unit, configured to, during the RRC connection re-establishment procedure, indicate to a network side that the terminal records reportable MCG failure information and SCG failure information; and a reporting unit, configured to, after receiving a reporting request message from the network side, report the MCG failure information and the SCG failure information to the network side.

A terminal provided in the embodiments of the present disclosure includes a processor and a memory. The memory is configured to store a computer program, and the processor is configured to invoke and run the computer program stored in the memory to perform the information reporting method described above.

A chip provided in the embodiment of the present disclosure is used for implementing the above information reporting method.

Specifically, the chip includes: a processor for invoking a computer program from a memory and running the computer program so that a device on which the chip is mounted perform the above information reporting method.

A computer-readable storage medium provided in the embodiment of the present disclosure is used for storing a computer program causing a computer to perform the above information reporting method.

A computer program product in the embodiment of the present disclosure includes computer program instructions causing a computer to perform the above information reporting method.

A computer program provided in the embodiment of the present disclosure, when run on a computer, causes the computer to execute the above information reporting method.

According to the above technical solutions, after detecting a failure event on the MCG side, the terminal reports the MCG failure information to the network side; after detecting a failure event on the SCG side, the terminal reports the SCG failure information to the network side; the MCG failure information or the SCG failure information is used by the network side to perform network optimization, so that a terminal-assisted network optimization scheme is implemented, mobility robustness of the network is improved, and user experience is improved.

BRIEF DESCRIPTION OF THE DRAWINGS

The drawings described herein are used to provide a further understanding of the application and form a part of the application. The schematic embodiments of the application and the description thereof are used to explain the application and do not constitute an improper limitation of the application. In the drawings:

FIG. 1 is a schematic diagram of a communication system architecture according to an embodiment of the present disclosure;

FIG. 2 is a schematic diagram of a dual connectivity architecture according to an embodiment of the present disclosure;

FIG. 3 is a first schematic flowchart of an information reporting method according to an embodiment of the present disclosure;

FIG. 4 is a first schematic diagram of an MAC CE according to an embodiment of the present disclosure;

FIG. 5 is a second schematic diagram of an MAC CE according to an embodiment of the present disclosure;

FIG. 6 is a second schematic flowchart of an information reporting method according to an embodiment of the present disclosure;

DETAILED DESCRIPTION

Figure 7:
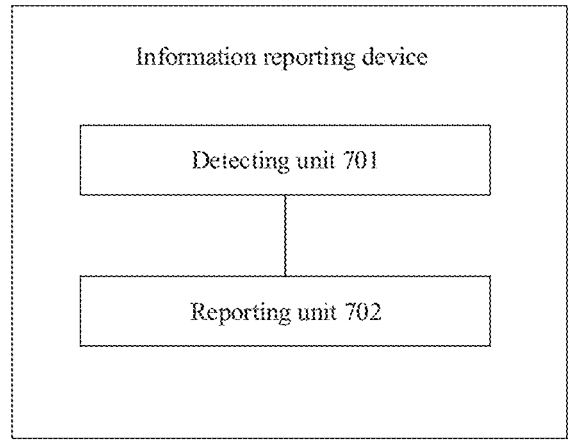
FIG. 7 is a first schematic structural diagram of an information reporting device according to an embodiment of the present disclosure.

The technical solution in the embodiments of the disclosure will be described below in conjunction with the drawings in the embodiments of the disclosure. It is apparent that the described embodiments are a part of the embodiments of the disclosure, not all of the embodiments. Based on the embodiments in the disclosure, all other embodiments obtained by those skilled in the art without creative effort belong to the protection scope of the disclosure The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Networks (WLAN), and a Wireless Fidelity (WiFi), next generation communication systems or other communication systems, or the like.

In general, conventional communication systems support a limited number of connections and are also easy to implement. However, with the development of communication technologies, mobile communication systems will not only support conventional communication, but also support communication, such as Device to Device (D2D) communication, Machine to Machine (M2M) communication, Machine Type Communication (MTC), and Vehicle to Vehicle (V2V) communication, etc., and embodiments of the present disclosure may also be applied to these communication systems.

Exemplarily, a communication system 100 to which an embodiment of the present disclosure applies is shown in FIG. 1. The communication system 100 may include a network device 110. The network device 110 may be a device in communication with a terminal device 120 (or referred to as a communication terminal, a terminal). The network device 110 may provide communication coverage for a particular geographic area and may communicate with terminal devices located within the coverage area. Optionally, the network device 100 may be a Base Transceiver Station (BTS) in a GSM system or a CDMA system, or may be a NodeB (NB) in a WCDMA system, or may be an Evolutional Node B (eNB or eNodeB) in an LTE system, or may be a network-side device in an NR system, or may be a wireless controller in a Cloud Radio Access Network (CRAN), or the network device may be a relay station, an access point, a vehicle-mounted device, a wearable device, a hub, a switch, a bridge, a router, a network-side device in a 5G network, a network device in a future evolutional Public Land Mobile Network (PLMN), or the like.

The wireless communication system 100 also includes at least one terminal device 120 located within coverage of the network device 110. The "terminal" used herein includes but is not limited to the connection via wired lines, such as via Public Switched Telephone Networks (PSTN), Digital Subscriber Line (DSL), digital cables, direct cable connections; and/or another data connection/network; and/or via a wireless interface, such as, for cellular networks, Wireless Local Area Network (WLAN), digital television networks such as DVB-H networks, satellite networks, AM-FM broadcast transmitters; and/or means of another terminal device arranged to receive/transmit communication signals; and/or Internet of Things (IOT) devices. A terminal device set to communicate via a wireless interface may be referred to as "a wireless communication terminal", "a wireless terminal" or "a mobile terminal". Examples of mobile terminals include, but are not limited to, satellite or cellular telephones; a Personal Communications System (PCS) terminal that may combine a cellular radio telephone with data processing, facsimile, and data communication capabilities; a PDA that may include a radio telephone, a pager, Internet/Intranet access, a Web browser, a laptop, a calendar, and/or a Global Positioning System (GPS) receiver; and conventional laptop and/or palmtop receivers or other electronic devices including radio telephone transceivers. The terminal device may refer to an access terminal, a User Equipment (UE), a subscriber unit, a subscriber station, a mobile station, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, a Wireless Local Loop (WLL) station, a Personal Digital Assistant (PDA), a handheld device having a wireless communication function, a computing device or other processing device connected to a wireless modem, an in-vehicle device, a wearable device, a terminal device in a future 5G network, a terminal device in a future evolved PLMN, or the like.

Optionally, Device to Device (D2D) communication may be performed between the terminal devices 120.

Optionally, the 5G system or 5G network may also be referred to as a New Radio (NR) system or NR network.

FIG. 1 illustrates one network device and two terminal devices. Optionally, the communication system 100 may include a plurality of network devices and another number of terminal devices may be included within the coverage of each network device, which is not limited in the embodiments of the present disclosure.

Optionally, the communication system 100 may further include other network entities such as a network controller, a mobility management entity and the like, which are not limited in the embodiments of the present disclosure.

It should be understood that a device having a communication function in a network/system in embodiments of the present disclosure may be referred to as a communication device. Taking the communication system 100 shown in FIG. 1 as an example, the communication device may include a network device 110 and a terminal device 120 having a communication function, and the network device 110 and the terminal device 120 may be specific devices described above, and details are not described herein. The communication device may also include other devices in the communication system 100, such as network controllers, mobility management entities, and other network entities, which are not limited in the embodiments of the present disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship.

To facilitate understanding of the technical solutions of the embodiments of the present disclosure, the related art of the embodiments of the present disclosure is described below. Any combination of the related art and the technical solutions of the embodiments of the present disclosure falls within the protection scope of the embodiments of the present disclosure.

With the pursuit of high rate, small delay, high-speed mobility, energy efficiency, and the diversity and complexity of services in future life, 5G is being developed for this purpose by the International Standards Organization of 3rd Generation Partnership Project (3GPP). The main application scenarios of the 5G are enhanced Mobile Broadband (eMBB), Ultra-Reliable Low-Latency Communications (URLLC), and massive Machine-Type Communications (mMTC).

On one hand, the eMBB continues to target users' access to multimedia content, services and data, and users' demand growth is very rapid. On the other hand, since the eMBB may be deployed in different scenarios, such as indoor area, urban area, rural area, and the like, the differences in the capabilities and requirements thereof are also relatively large, it is not possible to generalize, and detailed analysis must be done in combination with a specific deployment scenario. Typical applications for URLLC include: industrial automation, power automation, telemedicine operations (surgery), traffic safety, etc. Typical features of mMTC include: high connection density, small data volume, delay-insensitive services, low cost and long service life of modules, and the like.

At the time of early NR deployment, complete NR coverage is difficult to obtain, so typical network coverage is a wide-area LTE coverage and an island coverage mode of NR. Moreover, a large number of LTE systems are deployed below 6 GHz, and there are little spectrum below 6 GHz that can be used for the 5G. Therefore, the NR must study the spectrum application of 6 GHz or above, however, the high frequency band has limited coverage and fast signal fading. Furthermore, in order to protect the mobile operator's early investment in LTE, an operation mode of tight interworking between LTE and NR is proposed In order to be able to implement the 5G network deployment and commercial applications as soon as possible, the 3GPP first completed the first 5G version, that is EN-DC (LTE-NR Dual connectivity), by the end of December of 2017. In EN-DC, an LTE base station (eNB) is used as a Master Node (MN), an NR base station (gNB or en-gNB) is used as a Secondary Node (SN). A network deployment and networking architecture of EN-DC is shown in FIG. 2, where an Evolved Universal Terrestrial Radio Access Network (E-UTRAN) represents an access network part, an Evolved Packet Core network (EPC) represents a core network part, and the access network part includes at least one eNB (two eNBs as illustrated in FIG. 2) and at least one en-gNB (two en-gNBs as illustrated in FIG. 2). The eNB is used as an MN, the en-gNB is used as an SN, and both the MN and the SN are connected to the EPC.

For the EN-DC scenario, when a radio link failure occurs on the MCG side, regardless of whether the SRB signal on the SCG side is good or not, the RRC connection re-establishment is directly triggered. For the NR-E-UTRA Dual connectivity (NE-DC) scenario, the SCG side is not configured with the SRB and may also not be configured with the split SRB, thus when a radio link failure occurs on the MCG side, the MCG failure information cannot be reported through the RRC message.

FIG. 3 is a first schematic flowchart of an information reporting method according to an embodiment of the present disclosure. As shown in FIG. 3, the information reporting method includes the following operations.

In operation 301, after detecting that a failure event occurs on an MCG side or a failure event occurs on an SCG side, a terminal reports MCG failure information or SCG failure information to a network side, the MCG failure information or the SCG failure information being used by the network side for performing network optimization, where the MCG is a cell group of a master node and the SCG is a cell group of a secondary node.

In the embodiment of the present disclosure, the terminal may be any device capable of communicating with a network, such as a mobile phone, a tablet computer, a laptop, or an in-vehicle terminal.

In the embodiment of the present disclosure, the terminal is configured with a dual connectivity mode, where the cell group on the MN side is the MCG, and the cell group on the SN side is the SCG. Furthermore, the MCG includes a primary cell (Pcell) and a secondary cell (Scell), and the SCG includes a primary secondary cell (Pscell) and a secondary cell (Scell).

In the embodiment of the present disclosure, the failure event occurring on the MCG side that is detected by the terminal may be, but not limited to: a radio link failure occurring on the MCG; or, a handover failure occurring on the MCG. In a case where the terminal detects that a failure event occurs on the MCG side, the terminal may report the MCG failure information by any one of the following manners.

According to a first manner, in response to that a secondary node side is configured with an SRB, the terminal reports the MCG failure information to the secondary node by using the SRB on the secondary node side.

Herein, the SRB on the secondary node side includes at least one of SRB3, split SRB1, or split SRB2. The split SRB1 and the split SRB2 can be collectively referred to as split SRBs. The Packet Data Convergence Protocol (PDCP) layers of the split SRBs are on the master node side, and the PDCP layer of the SRB3 is on the secondary node side.

When a failure event occurs on the MCG side, if the secondary node side is configured with the SRB3 and the split SRB, the SRB3 is preferentially used to report the MCG failure information, and then the split SRB is used to report the MCG failure information.

According to a second manner, in response to that the secondary node side is not configured with the SRB, the terminal reports the MCG failure information to the secondary node by using a first MAC CE on the secondary node side.

When a failure event occurs on the MCG side, if the secondary node side is not configured with the SRB3 and the split SRB, the MAC CE (that is, the first MAC CE) is used to report the MCG failure information. Without being limited to the MAC CE, a Physical Uplink Control Channel (PUCCH) can also be used to report the MCG failure information according to the embodiment of the present disclosure.

For example, for the NE-DC scenario, the secondary node side is not configured with the SRB and may also not be configured with the split SRB. Therefore, the MCG failure information is reported by using the MAC CE (that is, the first MAC CE). In addition, for other dual connectivity scenarios, if there is no SRB on the secondary node side, the MCG failure information may also be reported by using the MAC CE. When the MAC layer on the network side receives the first MAC CE, the MAC layer reports the MCG failure information to the RRC layer, and the RRC layer forwards, according to content included in the MCG failure information, the MCG failure information to a node needing the MCG failure information.

In the embodiment of the present disclosure, the failure event occurring on the SCG side that is detected by the terminal may be, but not limited to: a radio link failure occurring on the SCG side; or, an SN change failure; or, a PScell change failure. In a case where the terminal detects that a failure event occurs on the SCG side, the terminal may report SCG failure information by any one of the following manners.

According to a first manner, the terminal reports the SCG failure information to the master node by using an SRB on the master node side.

Herein, the SRB on the master node side includes at least one of SRB1, or SRB2.

According to a second manner, the terminal reports the SCG failure information to the master node by using a second MAC CE on the master node side.

When a failure event occurs on the SCG side, the SRB1 is preferentially used to report the SCG failure information, and then the MAC CE (that is the second MAC CE) is used to report the SCG failure information.

In the embodiment of the present disclosure, regardless of the MCG failure information or the SCG failure information, the content thereof may include at least one of 1) to 6) below.

1) Measurement Result.

Herein, the measurement result includes at least one of: a cell measurement result of a serving cell, a beam measurement result of the serving cell, a cell measurement result of a neighboring cell, or a beam measurement result of the neighboring cell.

In an embodiment, the cell measurement result includes at least one of a measurement result type, a cell identification, or a measurement value; the measurement result type is at least one of: Reference Signal Received Power (RSRP), Reference Signal Received Quality (RSRQ) or Signal to Interference-plus-Noise Ratio (SINR).

In an embodiment, the beam measurement result includes at least one of: the measurement result type, a beam identification, the cell identification, the measurement value; the measurement result type is at least one of: RSRP, RSRQ or SINR.

For example, the measurement result is: a cell measurement result and/or a beam measurement result of an existing serving cell, which can be acquired by the current terminal; and a cell measurement result and/or a beam measurement result of a neighboring cell, which can be acquired by the current terminal. The measurement result type may be at least one of: RSRP, RSRQ or SINR.

2) First indication information, the first indication information being used for instructing the terminal to request the network side to perform a first operation.

The first instruction information is used for instructing the terminal to request the network side to perform a handover operation or a secondary node change operation, so that the network side solves the failure event by performing the handover operation or the secondary node change operation. Optionally, the first indication information may further indicate a node where the failure event occurs.

3) Failure Type.

For example, failure types on the MCG side include, but are not limited to: T310 expiry on the MCG side, random access problems, reaching of a maximum number of transmissions for RLC on the MCG side, handover failure, reconfiguration failure, and signaling integrity protection verification failure.

For example, the types of the failure event on the SCG side include, but are not limited to: T310 expiry on the SCG side, random access problem on the SCG side, reaching of a maximum number of transmissions for RLC on the SCG side, SCG change failure, SCG reconfiguration failure, and SRB3 integrity protection failure.

4) Second indication information, the second indication information being used for indicating a target node to which the MCG failure information or the SCG failure information is required to be reported, or indicating identification information of at least one of a serving cell or User Equipment (UE) before the failure.

The second indication information is used by a node receiving the MCG failure information or the SCG failure to forward, according to the second indication information, the MCG failure information or the SCG failure information to the target node, where the MCG failure information or the SCG failure information is used by the target node for performing network optimization.

Herein, the target node may be a master node and/or a secondary node.

Specifically, the second indication information can be selectively reported. If the failure information carries the second indication information, the node receiving the failure information forwards the failure information to the corresponding target node according to the second indication information. For example, if the node receiving the failure information is an MN and the target node indicated by the second indication information is the MN, the MN does not forward the failure information; if the second indication information indicates that the target node is an SN, the MN forwards the failure information to the SN; if the second indication information indicates that the target node is the MN and the SN, the MN forwards the failure information to the SN, and the MN also stores a copy of the failure information for network optimization purposes.

Herein, if the failure information carries the second indication information, forwarding of the failure information is performed according to the target node; if the failure information does not carry the second indication information, the node receiving the failure information determines, according to information such as the type of the failure information and the node where the failure event occurs (for example, identification information of at least one of a serving cell or UE before the failure), whether it needs to forward the failure information to other nodes.

5) First time information, the first time information being a time interval between a time when the terminal records the MCG failure information or the SCG failure information and a time when the terminal reports the MCG failure information or the SCG failure information.

Herein, if the terminal cannot report the MCG failure information or the SCG failure information to the network side immediately after detecting the failure event, the terminal carries the first time information in the MCG failure information or the SCG failure information reported to the network side.

Specifically, if the terminal immediately reports the failure information to the network side after detecting the failure event, the failure information does not need to carry the first time information; and after the network side receives the failure information, if the first time information is not included therein, the network side adds time information to the failure information according to a local time of the network side as input for network optimization. If the terminal cannot immediately report the failure information to the network side after detecting the failure event, the terminal carries first time information in the reported failure information, where the first time information is a time interval from the time when the terminal records the failure information to the time when the terminal reports the failure information, and the time interval may be in units of seconds, for example.

6) First location information, the first location information being location information of the terminal when the terminal records the MCG failure information or the SCG failure information.

Herein, the first location information includes at least one of location type information or location data; the location type information includes at least one of: Global Positioning System (GPS) location information, Global Navigation Satellite System (GNSS) location information, cell measurements of a plurality of neighboring cells, identifications of a plurality of serving cells, or a plurality of beam measurement results. Furthermore, the plurality of beam measurement results are beam measurement results of a plurality of beams having measurement values satisfying a first condition, and are determined from at least one of: the beam measurement results of the serving cell or the beam measurement results of the neighboring cell, the plurality of beams having measurement values satisfying the first condition includes: a plurality of beams having measurement values greater than or equal to a first threshold value; top N beams having measurement values sequenced according to a descending order, where N is a positive integer; or top N beams having measurement values greater than or equal to the first threshold value and sequenced according to a descending order, where N is a positive integer.

For example, the failure information reported by the terminal may include location type information and/or location data when the terminal detects a failure event. The location type information may be accurate location information, such as GPS location information and GNSS location information, or may be RSRP measurement results of six neighboring cells that are as location information, or may be cell ID information, and/or beam measurement results. The beam measurement results may be, but are not limited to: (1) IDs of top x beams of the current serving cell and/or measurement results corresponding to the top x beams, where top x beams refer to the first x beams having measurement values sequenced according to a descending order; (2) ID(s) of beam(s) satisfying a threshold th1 of the current serving cell and/or measurement result(s) corresponding to the beam(s); (3) IDs of top y beams satisfying a threshold th2 of the current serving cell and/or measurement results corresponding to the top y beams; (4) m beam IDs of serving cells and/or measurement results corresponding to the m beams, and n beam IDs of the neighboring cells and/or measurement results corresponding to the n beams; (5) z beam IDs of current serving cell and neighboring cells, and/or measurement results corresponding to z beams; (6) IDs of top a beams satisfying a threshold th3 of the current serving cell and neighboring cells and/or measurement results corresponding to the top a beams. The parameters x, y, z, a, and th1, th2, th3 may be derived from a network configuration or protocol specification.

The content carried in the MCG failure information or the SCG failure information is described below by taking the MAC CE as an example. It should be noted that the following MAC CE is merely an example, and the technical solutions of the embodiments of the present disclosure are not limited to the following example.

Referring to FIG. 4, the MAC CE includes the following information elements (IEs): Information existing bitmap, Failure type, Target node, Request indication, timestamp, Location type, Location information, Measurement results. The information existing bitmap gives the possibility of the occurrence of each IE. A bitmap is used to identify the possibilities, and each bit in the bitmap identifies an IE, for example, the possible IEs are a failure type, a target node, a request indication, a time stamp, location information, a measurement result, and the like. If a bit of an IE is set to 1, it means that information corresponding to the IE will be reported later, otherwise, the information corresponding to the IE will not be reported later. The reported information may be further subdivided in the Measurement Results, and more than two bytes can be used, which is only an example herein. For example, measurement results may further include measurement result types, cell IDs, beam IDs, measurement values, and the like. The measurement type may be a type determined by a combination of RSRP, RSRQ, SINR in cell level and/or beam level, and the like. Furthermore, the measurement results may also include the number of the measurement results to facilitate decoding. If there is a margin of less than 8 bits, 0 is padded to obtain the 8 bits. Location type may be, for example, type 1: GPS location information or GNSS location information; type 2: RSRP identification location information of 6 neighboring cells; type 3: serving cell ID, type 4: top 3 beam IDs; type 5: beam ID list satisfying the threshold; type 6: top 3 beam IDs and beam measurement results; and the like. Referring to FIG. 5, the Location type=4 and the Location information include a plurality of beam identifications (beam IDs).

FIG. 6 is a second schematic flowchart of an information reporting method according to an embodiment of the present disclosure. As shown in FIG. 6, the information reporting method includes the following operations.

In operation 601, after detecting that a failure event occurs on MCG side and a failure event occurs on SCG side, a terminal triggers a Radio Resource Control (RRC) connection re-establishment procedure; and during the RRC connection re-establishment procedure, the terminal indicates to a network side that the terminal records reportable MCG failure information and SCG failure information.

In the embodiment of the present disclosure, the terminal may be any device capable of communicating with a network, such as a mobile phone, a tablet computer, a laptop, or an in-vehicle terminal.

In the embodiment of the present disclosure, the terminal is configured with a dual connectivity mode, where the cell group on the master node side is the MCG, and the cell group on the secondary node side is the SCG. Furthermore, the MCG includes a Pcell and an Scell, and the SCG includes a Pscell and an Scell.

In the embodiment of the present disclosure, the RRC connection re-establishment procedure includes the following operations: 1) the terminal sends an RRC connection re-establishment request message to the network side; 2) the network side sends an RRC connection re-establishment message to the terminal; 3) the terminal sends an RRC connection re-establishment complete message to the network side. Herein, the terminal sends the RRC re-establishment complete message to the network side, where the RRC re-establishment complete message carries third indication information used for indicating that the terminal records the reportable MCG failure information and SCG failure information.

In operation 602, after receiving a reporting request message from the network side, the terminal reports the MCG failure information and the SCG failure information to the network side.

In the embodiment of the present disclosure, regardless of the MCG failure information or the SCG failure information, the content thereof may include at least one of 1) to 6) below.

1) Measurement Result.

Herein, the measurement result includes at least one of: a cell measurement result of a serving cell, a beam measurement result of the serving cell, a cell measurement result of a neighboring cell, or a beam measurement result of the neighboring cell.

In an embodiment, the cell measurement result includes at least one of a measurement result type, a cell identification, or a measurement value; the measurement result type is at least one of: RSRP, RSRQ or SINR.

In an embodiment, the beam measurement result includes at least one of: the measurement result type, a beam identification, the cell identification, the measurement value; the measurement result type is at least one of: RSRP, RSRQ or SINR.

For example, the measurement result is: a cell measurement result and/or a beam measurement result of an existing serving cell, which can be acquired by the current terminal; and a cell measurement result and/or a beam measurement result of a neighboring cell, which can be acquired by the current terminal. The measurement result type may be at least one of: RSRP, RSRQ or SINR.

2) First indication information, the first indication information being used for instructing the terminal to request the network side to perform a first operation The first instruction information is used for instructing the terminal to request the network side to perform a handover operation or a secondary node change operation, so that the network side solves the failure event by performing the handover operation or the secondary node change operation. Optionally, the first indication information may further indicate a node where the failure event occurs.

3) Failure Type.

For example, failure types on the MCG side include, but are not limited to: T310 expiry on the MCG side, random access problems, reaching of a maximum number of transmissions for RLC on the MCG side, handover failure, reconfiguration failure, and signaling integrity protection verification failure.

For example, the types of the failure event on the SCG side include, but are not limited to: T310 expiry on the SCG side, random access problem on the SCG side, reaching of a maximum number of transmissions for RLC on the SCG side, SCG change failure, SCG reconfiguration failure, and SRB3 integrity protection failure.

4) Second indication information, the second indication information being used for indicating a target node to which the MCG failure information or the SCG failure information is required to be reported, or indicating identification information of at least one of a serving cell or UE before the failure.

The second indication information is used by a node receiving the MCG failure information or the SCG failure to forward, according to the second indication information, the MCG failure information or the SCG failure information to the target node, where the MCG failure information or the SCG failure information is used by the target node for performing network optimization.

Herein, the target node may be a master node and/or a secondary node.

Specifically, the second indication information can be selectively reported. If the failure information carries the second indication information, the node receiving the failure information forwards the failure information to the corresponding target node according to the second indication information. For example, if the node receiving the failure information is an MN and the target node indicated by the second indication information is the MN, the MN does not forward the failure information; if the second indication information indicates that the target node is an SN, the MN forwards the failure information to the SN; if the second indication information indicates that the target node is the MN and the SN, the MN forwards the failure information to the SN, and the MN also stores a copy of the failure information for network optimization purposes.

Herein, if the failure information carries the second indication information, forwarding of the failure information is performed according to the target node; if the failure information does not carry the second indication information, the node receiving the failure information determines, according to information such as the type of the failure information and the node where the failure event occurs, whether it needs to forward the failure information to other nodes.

5) First time information, the first time information being a time interval between a time when the terminal records the MCG failure information or the SCG failure information and a time when the terminal reports the MCG failure information or the SCG failure information.

Here, if the terminal cannot report the MCG failure information or the SCG failure information to the network side immediately after detecting the failure event, the terminal carries the first time information in the MCG failure information or the SCG failure information reported to the network side.

Specifically, if the terminal immediately reports the failure information to the network side after detecting the failure event, the failure information does not need to carry the first time information; and after the network side receives the failure information, if the first time information is not included therein, the network side adds time information to the failure information according to a local time of the network side as input for network optimization. If the terminal cannot immediately report the failure information to the network side after detecting the failure event, the terminal carries first time information in the reported failure information, where the first time information is a time interval from the time when the terminal records the failure information to the time when the terminal reports the failure information, and the time interval may be in units of seconds, for example.

6) First location information, the first location information being location information of the terminal when the terminal records the MCG failure information or the SCG failure information.

Herein, the first location information includes at least one of location type information or location data; the location type information includes at least one of: GPS location information, GNSS location information, cell measurements of a plurality of neighboring cells, identifications of a plurality of serving cells, or a plurality of beam measurement results. Furthermore, the plurality of beam measurement results are beam measurement results of a plurality of beams having measurement values satisfying a first condition, and are determined from at least one of: the beam measurement results of the serving cell or the beam measurement results of the neighboring cell, the plurality of beams having measurement values satisfying the first condition includes: a plurality of beams having measurement values greater than or equal to a first threshold value; top N beams having measurement values sequenced according to a descending order, where N is a positive integer; or top N beams having measurement values greater than or equal to the first threshold value and sequenced according to a descending order, where N is a positive integer.

FIG. 7 is a first schematic structural diagram of an information reporting device according to an embodiment of the present disclosure. As shown in FIG. 7, the device includes a detecting unit 701 and 1 reporting unit 702.

The detecting unit 701 is configured to detect that a failure event occurs on MCG side or a failure event occurs on SCG side.

The reporting unit 702 is configured to report MCG failure information or SCG failure information to a network side, the MCG failure information or the SCG failure information being used by the network side for performing network optimization, wherein the MCG is a cell group of a master node and the SCG is a cell group of a secondary node.

In an embodiment, in a case where the detecting unit 701 detects that the failure event occurs on the MCG side, the reporting unit 702 is configured to:

in response to that a secondary node side is configured with SRB, report the MCG failure information to the secondary node by using the SRB on the secondary node side;

in response to that the secondary node side is not configured with the SRB, report the MCG failure information to the secondary node by using MAC CE on the secondary node side.

In an embodiment, the SRB on the secondary node side includes at least one of SRB3, split SRB1, or split SRB2.

In an embodiment, in a case where the detecting unit 701 detects that the failure event occurs on the SCG side, the reporting unit 702 is configured to:

report the SCG failure information to the master node by using an SRB on the master node side;

report the SCG failure information to the master node by using a second MAC CE on the master node side.

In an embodiment, the SRB on the master node side includes at least one of SRB1, or SRB2.

In an embodiment, the MCG failure information or the SCG failure information includes at least one of the following information.

A Measurement Result.

First indication information, the first indication information being used for instructing the terminal to request the network side to perform a first operation.

A Failure Type.

Second indication information, the second indication information being used for indicating a target node to which the MCG failure information or the SCG failure information is required to be reported, or indicating identification information of at least one of a serving cell or User Equipment (UE) before the failure.

First time information, the first time information being a time interval between a time when the terminal records the MCG failure information or the SCG failure information and a time when the terminal reports the MCG failure information or the SCG failure information.

First location information, the first location information being location information of the terminal when the terminal records the MCG failure information or the SCG failure information.

In an embodiment, the measurement result includes at least one of the following results.

A cell measurement result of a serving cell, a beam measurement result of the serving cell, a cell measurement result of a neighboring cell, or a beam measurement result of the neighboring cell.

In an embodiment, the cell measurement result includes at least one of a measurement result type, a cell identification, or a measurement value.

The measurement result type is at least one of: RSRP, RSRQ or SINR.

In an embodiment, the beam measurement result includes at least one of: the measurement result type, a beam identification, the cell identification, the measurement value.

The measurement result type is at least one of: RSRP, RSRQ or SINR

In an embodiment, the first indication information is used for instructing the terminal to request the network side to perform a handover operation or a secondary node change operation.

In an embodiment, the second indication information is used by a node receiving the MCG failure information or the SCG failure to forward, according to the second indication information, the MCG failure information or the SCG failure information to the target node, the MCG failure information or the SCG failure information is used by the target node for performing network optimization.

In an embodiment, if the reporting unit 702 cannot report the MCG failure information or the SCG failure information to the network side immediately after the failure event is detected by the detecting unit 701, the first time information is carried in the MCG failure information or the SCG failure information reported to the network side.

In an embodiment, the first location information includes at least one of location type information or location data.

The location type information includes at least one of: GPS location information, GNSS location information, cell measurements of a plurality of neighboring cells, identifications of a plurality of serving cells, or a plurality of beam measurement results.

In an embodiment, the plurality of beam measurement results are beam measurement results of a plurality of beams having measurement values satisfying a first condition, and are determined from at least one of: the beam measurement results of the serving cell or the beam measurement results of the neighboring cell.

The plurality of beams having measurement values satisfying the first condition includes:

a plurality of beams having measurement values greater than or equal to a first threshold value;

top N beams having measurement values sequenced according to a descending order, where N is a positive integer;

top N beams having measurement values greater than or equal to the first threshold value and sequenced according to a descending order, where N is a positive integer.

It should be understood by a person skilled in the art that the related description of the above-mentioned information reporting device of the embodiment of the present disclosure may be understood with reference to the related description of the information reporting method of the embodiment of the present disclosure.

Figure 8:
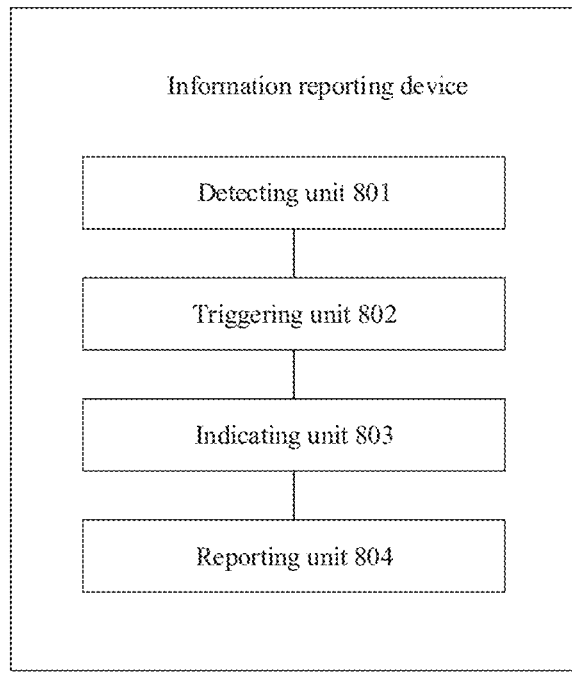
FIG. 8 is a second schematic structural diagram of an information reporting device according to an embodiment of the present disclosure.

FIG. 8 is a second schematic structural diagram of an information reporting device according to an embodiment of the present disclosure. As shown in FIG. 8, the device includes a detecting unit 801, a triggering unit 802, an indicating unit 803 and a reporting unit 804.

The detecting unit 801 is configured to detect that a failure event occurs on an MCG side and a failure event occurs on an SCG side.

The triggering unit 802 is configured to trigger a RRC connection re-establishment procedure.

The indicating unit 803 is configured to, during the RRC connection re-establishment procedure, indicate to a network side that the terminal records reportable MCG failure information and SCG failure information.

The reporting unit 804 is configured to, after receiving a reporting request message from the network side, report the MCG failure information and the SCG failure information to the network side.

In an embodiment, the indicating unit 803 is configured to send an RRC re-establishment complete message to the network side, the RRC re-establishment complete message carries third indication information, and the third indication information is used for indicating that the terminal records the reportable MCG failure information and SCG failure information.

In an embodiment, at least one of the MCG failure information or the SCG failure information includes at least one of:

a measurement result;

first indication information, the first indication information being used for instructing the terminal to request the network side to perform a first operation;

a failure type;

second indication information, the second indication information being used for indicating a target node to which the MCG failure information or the SCG failure information is required to be reported, or indicating identification information of at least one of a serving cell or UE before the failure;

first time information, the first time information being a time interval between a time when the terminal records the MCG failure information or the SCG failure information and a time when the terminal reports the MCG failure information or the SCG failure information;

first location information, the first location information being location information of the terminal when the terminal records the MCG failure information or the SCG failure information.

In an embodiment, the measurement result includes at least one of:

a cell measurement result of a serving cell, a beam measurement result of the serving cell, a cell measurement result of a neighboring cell, or a beam measurement result of the neighboring cell.

In an embodiment, the cell measurement result includes at least one of a measurement result type, a cell identification, or a measurement value.

The measurement result type is at least one of: RSRP, RSRQ or SINR.

In an embodiment, the beam measurement result includes at least one of: the measurement result type, a beam identification, the cell identification, the measurement value.

The measurement result type is at least one of: RSRP, RSRQ or SINR.

In an embodiment, the first indication information is used for instructing the terminal to request the network side to perform a handover operation or a secondary node change operation.

In an embodiment, the second indication information is used by a node receiving the MCG failure information or the SCG failure to forward, according to the second indication information, the MCG failure information or the SCG failure information to the target node, the MCG failure information or the SCG failure information is used by the target node for performing network optimization.

In an embodiment, if the reporting unit 804 cannot report the MCG failure information or the SCG failure information to the network side immediately after the failure event is detected by the detecting unit 801, the first time information is carried in the MCG failure information or the SCG failure information reported to the network side.

In an embodiment, the first location information includes at least one of: location type information or location data.

The location type information includes at least one of: GPS location information, GNSS location information, cell measurements of a plurality of neighboring cells, identifications of a plurality of serving cells, or a plurality of beam measurement results.

In an embodiment, the plurality of beam measurement results are beam measurement results of a plurality of beams having measurement values satisfying a first condition, and are determined from at least one of: the beam measurement results of the serving cell or the beam measurement results of the neighboring cell;

the plurality of beams having measurement values satisfying the first condition includes:

a plurality of beams having measurement values greater than or equal to a first threshold value;

top N beams having measurement values sequenced according to a descending order, where N is a positive integer; and top N beams having measurement values greater than or equal to the first threshold value and sequenced according to a descending order, where N is a positive integer.

It should be understood by a person skilled in the art that the related description of the above-mentioned information reporting device of the embodiment of the present disclosure may be understood with reference to the related description of the information reporting method of the embodiment of the present disclosure.

Figure 9:
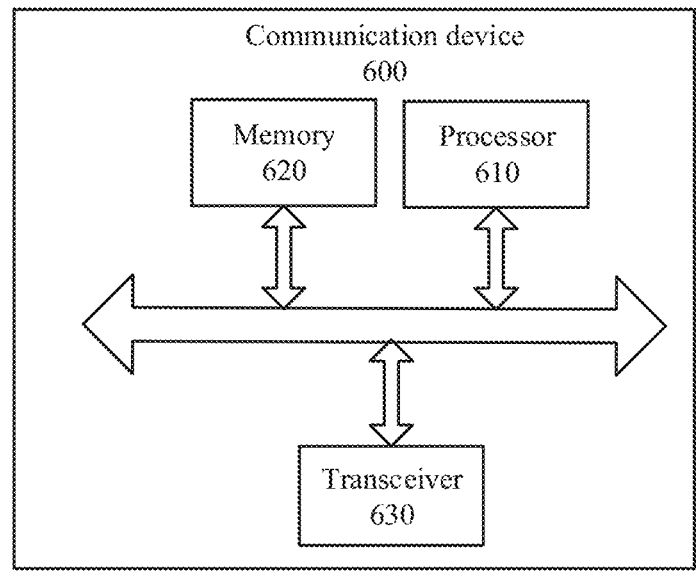
FIG. 9 is a schematic structural diagram of a communication device according to an embodiment of the present disclosure.

FIG. 9 is a schematic structural diagram of a communication device 600 provided in the embodiments of the present disclosure. The communication device can be a terminal. The communication device 600 illustrated in FIG. 9 includes processor 610, and processor 610 can call and run computer programs from memory to realize the method in the embodiments of the present disclosure Optionally, as illustrated in FIG. 9, the communication device 600 may further include a memory 620. The processor 610 can invoke and run the computer program from memory 620 to implement the method in the embodiments of the disclosure.

The memory 620 may be a separate device independent of or integrated into the processor 610.

Optionally, as illustrated in FIG. 9, the communication device 600 may also include a transceiver 630. The processor 610 may control the transceiver 630 to communicate with other devices, in particular, to send information or data to other devices, or receive information or data sent by other devices.

The transceiver 630 may include a transmitter and a receiver. The transceiver 630 may further include an antenna(s), the number of which may be one or more.

Optionally, the communication device 600 can be specifically a network device of the embodiment of the present disclosure, and the communication device 600 can realize the corresponding process realized by the network device in each method of the embodiments of the present disclosure. For the sake of simplicity, it will not be elaborated here.

Optionally, the communication device 600 can be a mobile terminal/terminal according to the embodiments of the present disclosure, and the communication device 600 can realize the corresponding flow realized by the mobile terminal/terminal in the various methods of the embodiments of the present disclosure. For the sake of brevity, it will not be described here.

Figure 10:
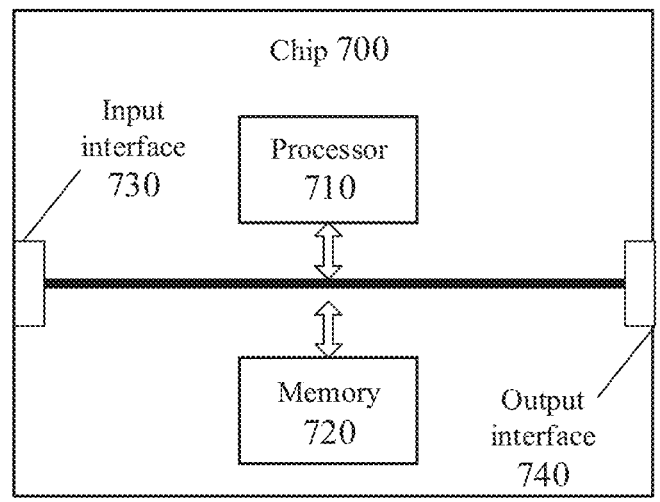
FIG. 10 is a schematic structural diagram of a chip according to an embodiment of the present disclosure.

FIG. 10 is a schematic structural diagram of a chip according to an embodiment of the present disclosure. The chip 700 illustrated in FIG. 10 includes processor 710, and processor 710 can invoke and run computer programs from memory to implement the method in the embodiments of the disclosure.

Optionally, as illustrated in FIG. 10, the chip 700 may also include a memory 720. The processor 710 can invoke and run the computer program from memory 720 to implement the method in the embodiments of the disclosure.

The memory 720 may be a separate device independent of or integrated into the processor 710.

Optionally, the chip 700 may also include an input interface 730. The processor 710 can control the input interface 730 to communicate with other devices or chips, and in particular can obtain information or data sent by other devices or chips.

Optionally, the chip 700 may also include an output interface 740. The processor 710 may control the output interface 740 to communicate with other devices or chips, and in particular may output information or data to other devices or chips.

Optionally, the chip can be applied to the network device in the embodiments of the present disclosure, and the chip can realize the corresponding process realized by the network device in each method of the embodiments of the disclosure. For the sake of brevity, it will not be elaborated here.

Optionally, the chip can be applied to the mobile terminal/terminal in the embodiments of the present disclosure, and the chip can realize the corresponding flow realized by the mobile terminal/terminal in each method of the embodiment of the disclosure. For the sake of simplicity, it will not be described here.

It is to be understood that the chips mentioned in the embodiments of the present disclosure can also be referred to as system level chips, system chips, chip systems or on-chip system chips, etc.

Figure 11:
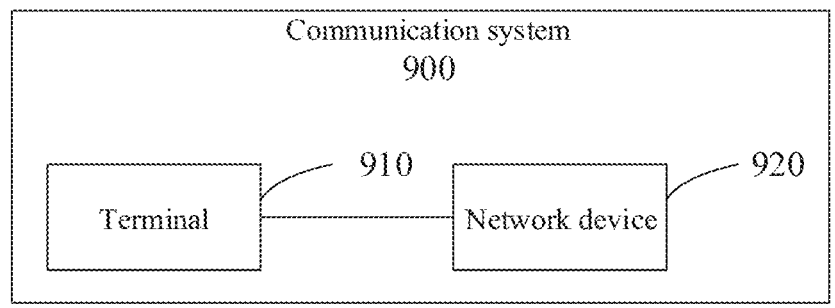
FIG. 11 is a schematic block diagram of a communication system according to an embodiment of the present disclosure.

FIG. 11 is a schematic block diagram of a communication system 900 provided by an embodiment of the present disclosure. As illustrated in FIG. 11, the communication system 900 includes terminal 910 and a network device 920.

The terminal 910 can be used to realize the corresponding functions realized by the UE in the above method, and the network device 920 can be used to realize the corresponding functions realized by the network device in the above method. For the sake of simplicity, it will not be elaborated here.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or nonvolatile memory, or may include both volatile and nonvolatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device in the embodiment of the present disclosure, and the computer program enables the computer to execute the corresponding processes implemented by the network device in the various methods of the embodiment of the present disclosure. For the sake of brevity, it will not be repeated here Optionally, the computer-readable storage medium can be applied to the mobile terminal/terminal in the embodiment of the present disclosure, and the computer program enables the computer to execute the corresponding processes implemented by the mobile terminal/UE in the various methods of the embodiment of the present disclosure. For the sake of brevity, it will not be repeated here.

The embodiment of the present disclosure also provides a computer program product, including a computer program instruction.

Optionally, the computer program product can be applied to the network device in the embodiments of the present disclosure, and the computer program instruction enables the computer to execute the corresponding processes implemented by the network device in the various methods of the embodiment of the disclosure. For the sake of brevity, it will not be repeated here.

Optionally, the computer program product can be applied to the mobile terminal/terminal in the embodiments of the present disclosure, and the computer program instruction enables the computer to execute the corresponding process implemented by the mobile terminal/terminal in the various methods of the embodiment of the disclosure, for the sake of brevity, it will not be repeated here.

The embodiment of the present disclosure also provides a computer program.

Optionally, the computer program can be applied to the network device in the embodiments of the present disclosure. When the computer program runs on the computer, the computer executes the corresponding process realized by the network device in each method of the embodiment of the disclosure. For the sake of brevity, it will not be described here.

Optionally, the computer program can be applied to the mobile terminal/terminal in the embodiments of the present disclosure. When the computer program runs on the computer, the computer executes the corresponding process realized by the mobile terminal/terminal in the various methods of the embodiment of the disclosure. For the sake of brevity, it will not be elaborated here.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be described here.

In several embodiments provided by the present disclosure, it should be understood that the disclosed systems, devices and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure, in essence or in the form of a software product, which is stored in a storage medium, includes several instructions for making a computer device (which can be a personal computer, a server, a network device, etc.) to perform all or part of the steps of the method according to each embodiment of the present disclosure. The aforementioned storage media include: U disk, mobile hard disk, read-only memory (ROM), random access memory (RAM), disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

The invention claimed is:

1. An information reporting method, comprising:
after detecting that a failure event occurs on a Master Cell Group (MCG) side or a failure event occurs on a Secondary Cell Group (SCG) side, reporting, by a terminal, MCG failure information or SCG failure information to a network side, the MCG failure information or the SCG failure information being used by the network side for performing network optimization, wherein the MCG is a cell group of a master node and the SCG is a cell group of a secondary node;

wherein the MCG failure information or the SCG failure information comprises first time information, the first time information being a time interval between a time when the terminal records the MCG failure information or the SCG failure information and a time when the terminal reports the MCG failure information or the SCG failure information, and the method further comprise:

if the terminal is unable to report the MCG failure information or the SCG failure information to the network side immediately after detecting the failure event, carrying, by the terminal, the first time information in the MCG failure information or the SCG failure information reported to the network side.

2. The method of claim 1, wherein in a case where the terminal detects that the failure event occurs on the MCG side, in response to that a secondary node side is configured with a Signalling Radio Bearer (SRB), reporting, by the terminal, the MCG failure information to the secondary node by using the SRB on the secondary node side.

3. The method of claim 2, wherein the SRB on the secondary node side comprises at least one of SRB3, split SRB1, or split SRB2.

4. The method of claim 1, wherein in a case where the terminal detects that the failure event occurs on the SCG side, reporting, by the terminal, the SCG failure information to the master node by using an SRB on the master node side.

5. The method of claim 4, wherein the SRB on the master node side comprises at least one of SRB1, or SRB2.

6. The method of claim 1, wherein the MCG failure information or the SCG failure information comprises at least one of:

a measurement result;

a failure type;

second indication information, the second indication information being used for indicating a target node to which the MCG failure information or the SCG failure information is required to be reported, or indicating identification information of at least one of a serving cell or User Equipment (UE) before the failure; or first location information, the first location information being location information of the terminal when the terminal records the MCG failure information or the SCG failure information.

7. The method of claim 6, wherein the measurement result comprises at least one of:

a cell measurement result of a serving cell, a beam measurement result of the serving cell, a cell measurement result of a neighboring cell, or a beam measurement result of the neighboring cell.

8. The method of claim 7, wherein the cell measurement result comprises at least one of a measurement result type, a cell identification, or a measurement value, wherein the measurement result type is at least one of: Reference Signal Received Power (RSRP), Reference Signal Received Quality (RSRQ) or Signal to Interference-plus-Noise Ratio (SINR).

9. The method of claim 7, wherein the measurement result type is at least one of: RSRP, RSRQ or SINR.

10. The method of claim 6, wherein the first location information comprises at least one of location type information or location data, wherein the location type information comprises at least one of: Global Positioning System (GPS) location information, Global Navigation Satellite System (GNSS) location information, cell measurements of a plurality of neighboring cells, identifications of a plurality of serving cells, or a plurality of beam measurement results.

11. The method of claim 10, wherein the plurality of beams having measurement values satisfying a first condition comprises:

a plurality of beams having measurement values greater than or equal to a first threshold value;

top N beams having measurement values sequenced according to a descending order, where N is a positive integer; or top N beams having measurement values greater than or equal to the first threshold value and sequenced according to a descending order, where N is a positive integer.

12. An information reporting device, comprising:

a processor; and a memory for storing a computer program executable by the processor;

wherein the processor is configured to:

detect that a failure event occurs on a Master Cell Group (MCG) side or a failure event occurs on a Secondary Cell Group (SCG) side; and report MCG failure information or SCG failure information to a network side, the MCG failure information or the SCG failure information being used by the network side for performing network optimization, wherein the MCG is a cell group of a master node and the SCG is a cell group of a secondary node;

wherein the MCG failure information or the SCG failure information comprises first time information, the first time information being a time interval between a time when the terminal records the MCG failure information or the SCG failure information and a time when the terminal reports the MCG failure information or the SCG failure information, and wherein the processor is configured to: if the MCG failure information or the SCG failure information is not reported to the network side immediately after detecting the failure event, carry the first time information in the MCG failure information or the SCG failure information reported to the network side.

13. The device of claim 12, wherein in a case where it is detected that the failure event occurs on the MCG side, the processor is configured to:

in response to that a secondary node side is configured with a Signalling Radio Bearer (SRB), report the MCG failure information to the secondary node by using the SRB on the secondary node side.

14. The device of claim 13, wherein the SRB on the secondary node side comprises at least one of SRB3, split SRB1, or split SRB2.

15. The device of claim 12, wherein in a case where it is detected that the failure event occurs on the SCG side, the processor is configured to:

report the SCG failure information to the master node by using an SRB on the master node side.

16. The device of claim 15, wherein the SRB on the master node side comprises at least one of SRB1, or SRB2.

17. The device of claim 12, wherein the MCG failure information or the SCG failure information comprises at least one of:
- a measurement result;
- a failure type;
- second indication information, the second indication information being used for indicating a target node to which the MCG failure information or the SCG failure information is required to be reported, or indicating identification information of at least one of a serving cell or User Equipment (UE) before the failure; or
- first location information, the first location information being location information of the terminal when the terminal records the MCG failure information or the SCG failure information.

18. The device of claim 17, wherein the measurement result comprises at least one of:
- a cell measurement result of a serving cell, a beam measurement result of the serving cell, a cell measurement result of a neighboring cell, or a beam measurement result of the neighboring cell.

19. The device of claim 18, wherein the cell measurement result comprises at least one of a measurement result type, a cell identification, or a measurement value,
wherein the measurement result type is at least one of: Reference Signal Received Power (RSRP), Reference Signal Received Quality (RSRQ) or Signal to Interference-plus-Noise Ratio (SINR).

20. The device of claim 18, wherein the measurement result type is at least one of: RSRP, RSRQ or SINR.

21. The device of claim 17, wherein the first location information comprises at least one of location type information or location data,
wherein the location type information comprises at least one of: Global Positioning System (GPS) location information, Global Navigation Satellite System (GNSS) location information, cell measurements of a plurality of neighboring cells, identifications of a plurality of serving cells, or a plurality of beam measurement results.

22. The device of claim 13, wherein the plurality of beams having measurement values satisfying a first condition comprises:
- a plurality of beams having measurement values greater than or equal to a first threshold value;
- top N beams having measurement values sequenced according to a descending order, where N is a positive integer; or
- top N beams having measurement values greater than or equal to the first threshold value and sequenced according to a descending order, where N is a positive integer.

* * * * *